United States Patent [19]

Rapparlie et al.

[11] 3,752,043

[45] Aug. 14, 1973

[54] STACK FORMING APPARATUS

[75] Inventors: Hans Rapparlie, Konstanz; Gisbert Burkardt, Reichenau, both of Germany

[73] Assignee: Licentia Patent-Verwaltungs-GmbH, Frankfurt am Main, Germany

[22] Filed: June 1, 1971

[21] Appl. No.: 148,335

[30] Foreign Application Priority Data
May 29, 1970 Germany.................. P 20 26 297.9
May 29, 1970 Germany............ HGM 70 20 026.9

[52] U.S. Cl..................... 93/93 DP, 271/46, 271/76, 271/DIG. 8
[51] Int. Cl.............................................. B65h 33/12
[58] Field of Search...................... 94/93 R, 93 DP; 198/21, 35; 271/76, 46, DIG. 8

[56] References Cited
UNITED STATES PATENTS

| | | | |
|---|---|---|---|
| 3,374,902 | 3/1968 | Mills | 271/76 X |
| 1,545,915 | 7/1925 | Maxson | 271/DIG. 8 |
| 3,191,927 | 6/1965 | Hartbauer et al. | 93/93 R |
| 2,852,990 | 9/1958 | Roe | 93/93 DP |

*Primary Examiner*—Andrew R. Juhasz
*Assistant Examiner*—James F. Coan
*Attorney*—Spencer & Kaye

[57] ABSTRACT

Apparatus for forming stacks of individual articles from a continuous stream of such articles has a first conveying means for positively conveying flat articles at a predetermined constant speed along a first conveying path. A second conveying means is arranged for positively conveying articles received from the first conveying means along a second conveying path. The inlet of the second conveying means is spaced from the outlet of the first conveying means a distance greater than the length of an individual article. An abutment surface is arranged to extend in the direction of the second conveying path, the first and second conveying paths being arranged at an angle $\alpha$ with respect to one another. The vertex of angle $\alpha$ is on the abutment surface and is arranged adjacent to the input of the second conveying means. Means are provided for selectively moving the articles along the second conveying means at a first predetermined speed and a second predetermined speed less than the first speed. Means are provided for monitoring the stream of articles and sensing the thickness of a stack for rapidly switching the means for selectively moving from the first speed to the second speed when a predetermined stack thickness has been reached. This results in articles at the input of the second conveying means overlapping one another and producing a gap in the stream of articles. Means are provided for receiving articles from the second conveying means for forming a stack and for rapidly moving a stack of articles when a predetermined thickness has been reached for the stack.

12 Claims, 6 Drawing Figures

Patented Aug. 14, 1973

Inventors.
Hans Rapparlie
Gisbert Burkhardt

BY Spencer & Kaye
ATTORNEYS.

Patented Aug. 14, 1973

Inventors,
Hans Rapparlie
Gisbert Burkhardt

BY *Spencer & Kays*
ATTORNEYS.

STACK FORMING APPARATUS

BACKGROUND OF THE INVENTION

The present invention relates to an apparatus for forming stacks of a conveyed stream of individually furnished flat article such as, for example, mail shipments. The apparatus has a delaying device disposed in the conveying path for producing a gap in the stream of articles and a monitoring device which, after a predetermined thickness has been reached for the stack actuates the delaying device as well as a device for rapidly removing the stack.

A device of this general type is shown in German Printed Application 1,260,384, published Feb. 1, 1968. This apparatus stacks flat articles in containers, and the stacks are then removed by a quick relative movement between the stacking point and the containers. The full stack container is replaced by an empty one in the process. The delaying device in this prior art apparatus is a so-called pass-through separator whose outlet conveying member is temporarily stopped or appropriately delayed. When the outlet conveying member starts up again, it again individually removes the accumulated items, temporarily at a higher speed, and brings them to the stacking point for form a new stack.

The technical costs for such a device are too high for many intended applications, since each intended stacking point must be provided with a separate pass-through separator with rapidly controllable removal.

SUMMARY OF THE INVENTION

It is an object of the present invention to provide apparatus of the above-mentioned type in which the desired mode of operation can be realized while fully maintaining the operational safety of the apparatus and with less expenditure than in the known device.

This is accomplished according to the present invention by a combination of the following features:

a. in the conveying path leading to the stacking point, two consectutive conveying paths are provided in which the articles are positively carried along by, for example, endless conveying means so arranged that the distance between the outlet of a first conveying means and the inlet of the second conveying means is greater than the length of one article; the conveying directions of the two conveying paths including an acute angle whose vertex is disposed on an abutment surface provided in front of the inlet of the second conveying means and extending in its conveying direction; and b. the conveying speed of the first conveying means remains unchanged, but means are provided for switching the conveying speed of the second conveying means in dependence on the actuation of the monitoring device, quickly from a first speed to a much lower second speed, so that during the duration of the switching process a conveying stream of overlapping items is produced at the inlet of the second conveying path.

In connection with the present invention, the inlet and the outlet of a conveying means are intended to mean that point at which the positive conveyance of the items by the respective conveying means begins or ends, respectively. Stacking point is that point in the apparatus where the arriving articles come into the range of the stack to be formed. The endless conveying means may be, for example, conveying rollers or conveyor belts.

In a preferred embodiment of the present invention, the apparatus is so designed that the stacks are formed on the side of the second conveying path on which the abutment surface is formed. The direction of overlap produced permits a quick return of the conveying speed of the second conveying path to the first speed, so that the articles delayed in the second conveying path may be accelerated together to the full stacking speed, and are brought to the stacking point, or the stack, in their overlapping arrangement. The outlet of the second conveying means may open directly at the stacking point.

It is also possible, however, within the scope of the present invention, to arrange a third conveying means between the second conveying means and the stacking points. This third conveying means rotates at a constant peripheral speed which corresponds to the stacking speed and which conveys the articles arriving from the second conveying means along a third conveying path to the stacking point. This modified device can operate in two possible ways:

When the above-mentioned sense of overlap is given, the second conveying means and the articles delayed thereon, which are now in overlapping relationship, are quickly accelerated, after the completed stack has been removed, to the original, or first conveying speed of this path, and are transferred, in their overlapping arrangement, to a third conveying means.

Independent of the sense of overlap of the articles in the second conveying means, the apparatus according to the present invention, may, however, also be so designed that after removal of a stack, the return of the second conveying means to the first speed occurs gradually. This will result in at least a portion of the articles which were delayed in the second conveying means, and which are now in overlapping relationship, from being pulled out of their overlapping position during the change-over time and in being individually brought to the stacking point.

DESCRIPTION OF THE PREFERRED EMBODIMENTS

Figure 1:
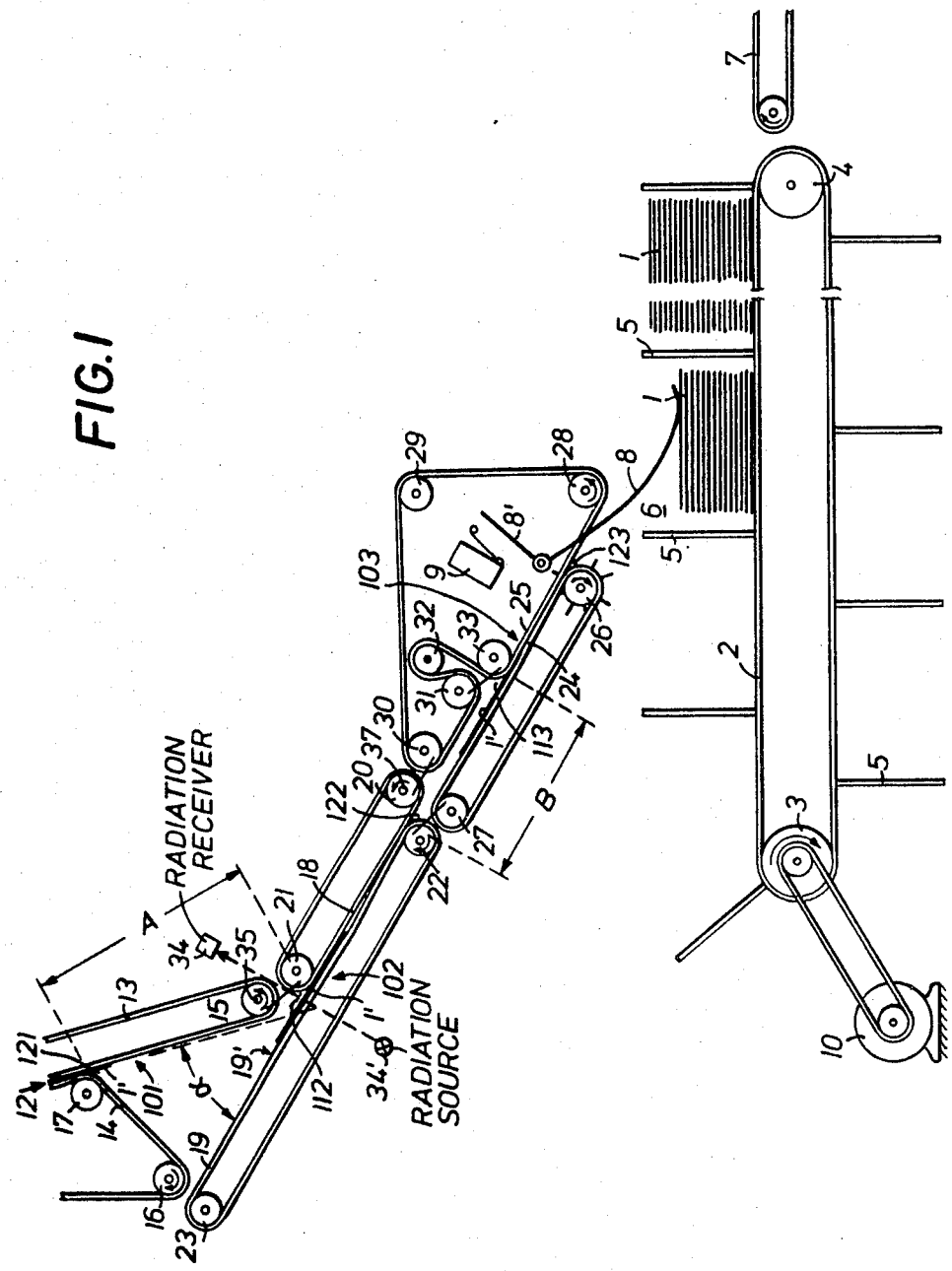
FIG. 1 is a schematic side elevational view of apparatus according to the present invention for forming stacks of individual flat articles.
Figure 2:
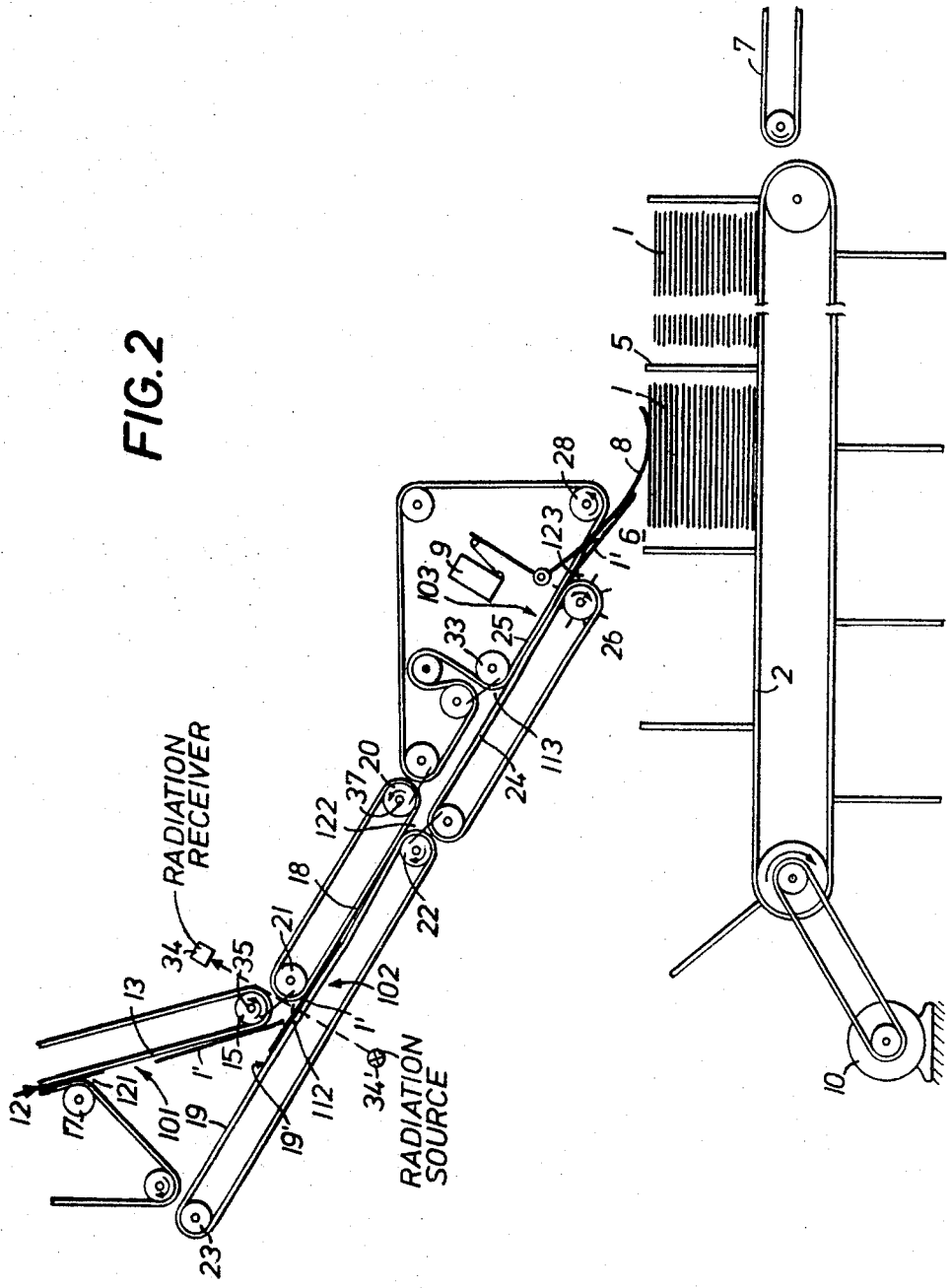
FIG. 2 is a schematic side elevational view similar to FIG. 1, but in a different operating mode.
Figure 3:
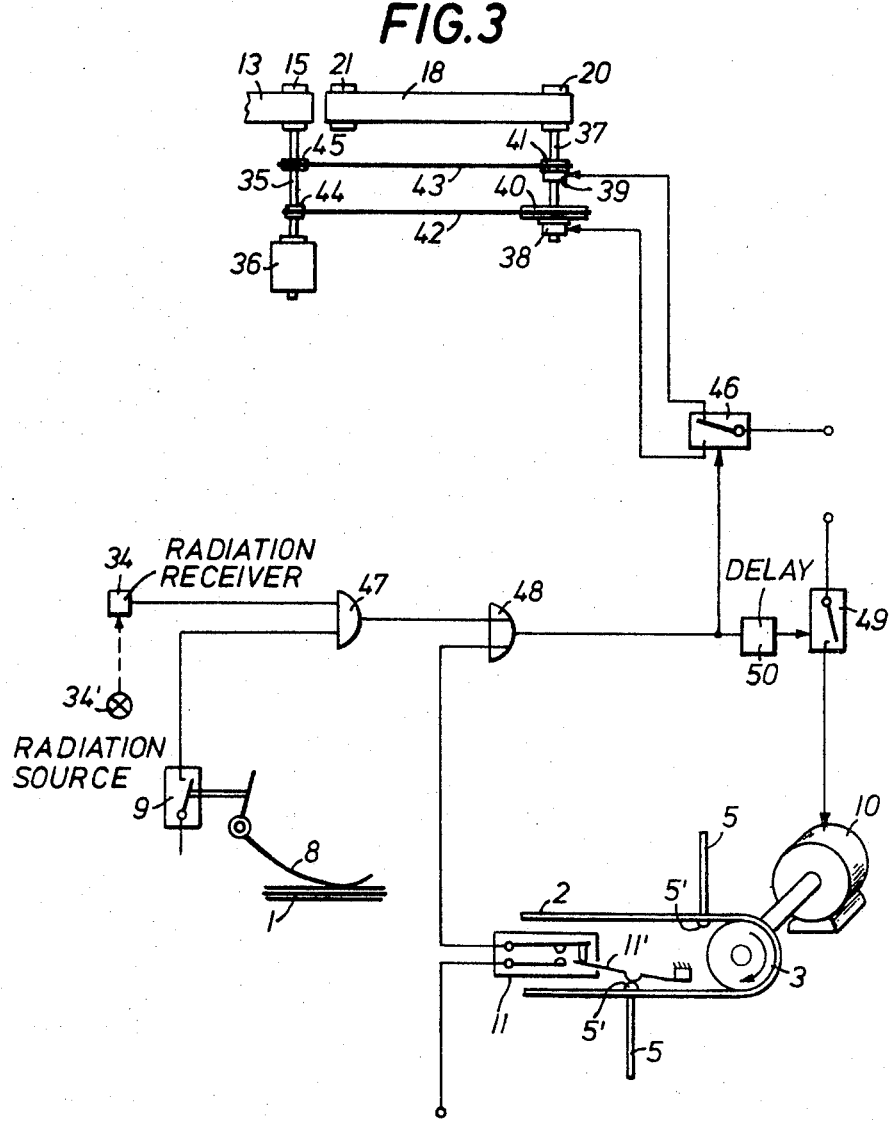
FIG. 3 is a schematic diagram of the monitoring and control system for the embodiment of the present invention illustrated in FIGS. 1 and 2.

The conveying device for removing stacks 1 employed in the embodiment of FIGS. 1—3 has a suitable, known conveyor belt 2 which runs around suitable, known guide rollers 3 and 4. Rollers 3 and 4 are mounted in a frame (not shown) in a suitable manner. A plurality of slats 5 are uniformly distributed over the periphery of conveyor belt 2 form individual stacking compartments. As soon as a predetermined thickness has been reached for a stack, the full stacking compartment is replaced by an empty one by means of one conveying step of conveyor belt 2. The removed stacks are eventually transferred to a further, continuously driven conveyor belt 7. Conveyor belt 7 is a suitable known belt mounted for rotation in a known manner.

The thickness of the stack of individual flat articles 1' formed at a stacking point 6 is sensed by a sensor lever 8 (FIG. 1) which, after the predetermined thickness has been reached, actuates a suitable, known single pole, single throw switch 9 with arm 8' (FIG. 2). The conveyor belt 2 is driven by a suitable, known geared motor 10 which is switched on-and-off by a monitoring and control device which will be described in connection with FIG. 3. Motor 10 may be, for example, an electric motor. The position of conveyor belt 2, and of slats 5, is monitored by a suitable known normally closed single pole, single throw switch 11 shown in FIG. 3. Switch 11 is closed during the changing of compartments and is opened, as soon as the next stacking compartment has reached position at stacking point 6. This is done by means of a suitably bent spring arm 11' which is actuated by projections 5' corresponding to each of slats 5.

A conveying path leading to stacking point 6 has the articles 1' move in the direction of arrow 12 (FIGS. 1 and 2) first into a first conveying means 101 having suitable, known endless conveyor belts 13 and 14 which move about suitable, known guide rollers, of which rollers 15, 16 and 17 are shown in the drawing. These belts positively convey articles 1' at a predetermined constant speed along a first conveying path between conveyor belts 13, 14. The driven rollers of the apparatus are indicated in the drawings by a direction of movement arrow. A second conveying means 102 follows and has suitable, known endless conveyor blets 18 and 19 with suitable, known guide rollers 20, 21 and 22, 23, respectively. Articles 1' are positively conveyed along a second conveying path between conveyor belts 18, 19.

The consectuive first and second conveying paths are so arranged that the distance A (FIG. 1) between the outlet 121 of the first conveying means 101, which outlet 121 is formed by roller 17 and conveyor belt 13, and the inlet 112 of the second conveyor means 102, which inlet 112 is formed by roller 21 and conveyor belt 19, is greater than the longest possible length of an article 1'. The conveying directions of the two conveying paths include an acute angle $\alpha$. The vertex of this angle $\alpha$ lies on an abutment surface 19', which is disposed in front of inlet 112 and extends in the conveying direction of second conveying means 102, and adjacent inlet 112.

The abutment surface 19' in the illustrated embodiment is preferably formed by a rearward extension of conveyor belt 19 into the area of the first conveying path. The conveyor belt 13 of the first conveying means 101 preferably extends into the area of the inlet 112, as shown in FIGS. 1 and 2.

Figure 4:
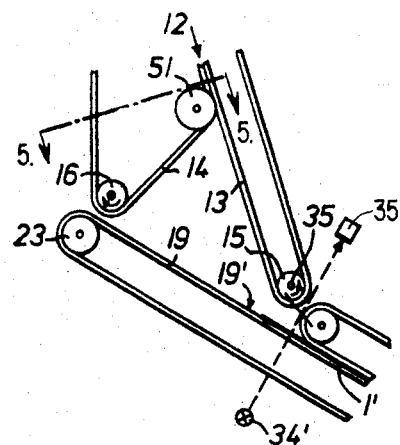
FIG. 4 is a schematic side elevation view relating to a modified detail of an apparatus as shown in FIGS. 1 and 2.
Figure 5:
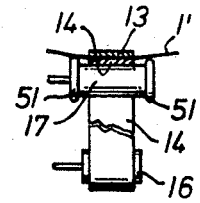
FIG. 5 is a cross-sectional view taken generally along line 5—5 of FIG. 4.

The outlet 121 may, moreover, be so designed that the articles 1' receive a curvature about their longitudinal axis for stiffening the same before they arrive on abutment surface 19'. Such an arrangement is known per se. It may be realized, for example, in that the guide roller 17 is provided with lateral flanges 51 which protrude beyond the conveyor belt 14 on both sides as shown in FIGS. 4 and 5. Between the second conveying path 102 and the stacking point 6, a third conveying means 103 may be disposed which has two suitable, known endless conveyor belts 24 and 25 moving about suitable, known guide rollers 26 and 27, and 28 to 33, respectively. Third conveying means 103 positively conveys articles 1' along a third conveying path between conveyor belts 24 and 25. The inlet 113 of conveying means 103 — that is, the point at which the positive conveying of articles 1' begins, is formed by guide roller 33 and conveyor belt 24. Distance B of inlet 113 of third conveying means 103 spaced from the outlet 122 of the second conveying means 102 is greater than the longest possible length of an article 1'. Roller 26 is designed in a known manner as a brush roller in order to support the stacking process by pushing down the trailing edges of the articles 1' as they leave outlet 123 of third conveying means 103. A similar brush may be attached to roller 17 at the outlet 121 of the first conveying means 101. Brush rollers of this kind are known for instance from German Published Application DAS 1 113 182.

For bridging the space between the outlet 122 conveying path and inlet 113, guide means may be provided defining a passage having a spacing greater than the thickness of the conveying stream of overlapping articles 1' as may be produced in the second conveying means 102 in a manner to be explained below. In an advantageous manner these guide means are formed in the illustrated embodiment by portions of the runs of conveyor belts 24 and 15 of the third conveying means 103. The desired spacing is produced by a special arrangement of guide rollers 30 to 33 supporting conveyor belt 25.

The conveying speed $v_1$ of the first conveying means 101 remains sustantially constant in all operating phases of the apparatus. So does the conveying speed $v_3$ of the third conveying means 103, which in the illustrated embodiment is equal to $v_1$. The conveying speed of the second conveying means 103, however, may be switched, in dependence on the actuation of a monitoring device which will be discussed below and which includes switch 9 of sensing lever 8, from a first speed $v_2$, which in the illustrated embodiment is equal to $v_1$, to a much lower speed $v_2$. For the duration of the period at speed $v_2$, a conveying stream on overlapping articles 1' is produced at inlet 112 as shown in FIG. 2, since a preceding article 1' is still disposed in the area of abutment surface 19' — near the vertex of angle $\alpha$ in FIG. 1 — when the next article 1' furnished by the first conveying means 101 arrives at inlet 112.

In principle, it would be possible to control the change in the conveying speed of the second conveying means and the removal of the stack only in dependence on the actuation of switch 9. However, it is more advantageous to include an element in the monitoring device which is dispoded at a suitable point in the conveying path and responds to the passage of arriving shipments. In the illustrated embodiment, this member is constituted by a suitable, known radiation sensor 34, 34', such as a light emitter 34' and detector 34, which is dispoded ahead of inlet 112 and emits a signal when and as long as it is darkened by the passage of articles 1'.

Guide rollers 15 and 16 (FIGS. 1 and 2) of the first conveying means are driven via a shaft 35 (FIG. 3) by, for example, suitable, known motor 36, such as an electric motor, running at a constant RPM. Rollers 26 and 28 (FIGS. 1 and 2) may be driven by a shaft (not shown) connected to shaft 35 in a known manner, such as by belts (not shown). Alternatively, a separate motor or motors (not shown) may be used. The guide rollers 20 and 22 (FIGS. 1 and 2) of the second conveying means are driven via, for example, a shaft 37. A large belt pulley 40 and a small belt pulley 41 are mounted on shaft 37 in a known manner for rotation with respect thereto, and can be connected to shaft 37 for rotation therewith, by, for example, suitable, known electromagnetic couplings 38 and 39, respectively. These pulleys 40, 41 are in driven connection via belts 42 and 43 with pulleys 44 and 45, respectively. Pulleys 44 and 45 are firmly mounted on shaft 35 for rotation therewith. The diameter ratios of belt pulleys 41, 45 and 40, 44 are so selected that when coupling 39 is actuated, the first conveying speed $v_2$ results at guide rollers 20 and 22, and when coupling 38 is actuated, the second conveying speed $v_2$, results at rollers 20 and 22. Speed $v_2$, is, for example, one quarter that of $v_2$. A suitable, known single pole, double throw electrical switch 46 actuates coupling 39 in the position illustrated in FIG. 3, in the other position, the operating position, it actuates coupling 38. All of the shafts and motors are mounted in, for example, a suitable, known frame (not shown).

The electrical outputs of switch 9 and radiation sensor 34, 34' are combined in a suitable, known AND circuit 47 whose output is connected to a suitable, known OR circuit 48. A second input of OR circuit 48 is connected with switch 11 which is operated in dependence on the position of conveyor belt 2 and slots 5. Motor 10 for driving conveyor belt 2 can be switched on by a suitable, known single pole, single throw switch 49 which is normally open. An output signal from OR circuit 48 actuates switch 46 directly via known transmission members (not shown) and actuates switch 49 via a suitable, known delay stage 50.

The apparatus according to FIGS. 1 to 3 operates as follows:

During the stacking phase shown in FIG. 1, switches 9 and 11 are open so that no signal reaches OR circuit 48. Switches 46 and 49 are in the positions illustrated in FIG. 3. The second conveying means is coupled to, for example, motor 36 via coupling 39 corresponding to conveying speed $v_2$. The motor 10 is at rest.

Articles 1' — which are, for example, pieces of mail shipments — are individually brought to the device in a substantially uniform sequence — for example, with a spacing of their leading edges of approximately 400mm, or a minimum gap between articles 1' of approximately 100mm. Articles 1' pass through the three defined conveying paths with uniform speed and, thus, constant spacing, and are brought to stacking point 6 at the outlet 123 of the third conveying means 103. This brings articles 1' to a stack 1 formed at point 6. With each passage of an article 1' past radiation sensor 34,34', a signal is sent to AND circuit 47, which remains ineffective, however, because switch 9 is open.

As soon as the respective stack 1 has reached the predetermined thickness, switch 9 is closed via arm 8' of sensor lever 8. With the next signal from radiation sensor 34, 34' — at the moment of arrival of the leading edge of an article 1' in the radiation path — the AND circuit 47 emits a signal to the OR circuit 48 which places switch 46 into the operating position and switches the conveying speed of the second conveying means 102 to a substantially smaller value $v_2$', by actuating coupling 38. The respective article 1' is, thus, strongly delayed in the second conveying path and the following article 1' catches up with it, so that an overlap results in the area of the vertex of angle $\alpha$ (FIG. 1). This operating phase is shown in FIG. 2. It can be seen that at this moment an article 1' is, when third conveying means 103 is present, still on the way to stacking point 6 at the original conveying speed. Only when this article 1' has also reached the stack — that is, when no more articles 1' are disposed between output 122 and stacking point 6, will switch 49 of motor 10 be switched on via the appropriately dimensioned delaying stage 50 to drive conveyor belt 2. The dimensioning of delaying stage 50 is a function of the time required for the last article 1' to reach stack 1.

Conveyor belt 2 now takes a conveying step clockwise so that the full stacking compartment 1 is replaced by an empty one. This also closes the previously open switch 11, so that OR circuit 48 continues to actuate switches 46 and 49 even when switch 9 of the sensing lever 8 is open again.

Upon completion of the conveying step of conveyor belt 2 — that is, as soon as the next empty stacking compartment 1 takes up the place of the removed full stacking compartment 1, the next projection 5' opens switch 11 again. Thus switches 49 and 46 return to their rest position. Motor 10 is switched off; the conveying speed of the second conveying means, between whose conveyor belts 18 and 19 a plurality of overlapped articles 1' have accumulated in the meantime, is quickly switched to the first speed $v_2$ so that these articles 1' are accelerated together and move in their overlapping arrangement over, for example, conveyor belts 24 and 25 of the third conveying means 103 to form a new stack 1 at stacking point 6.

Figure 6:
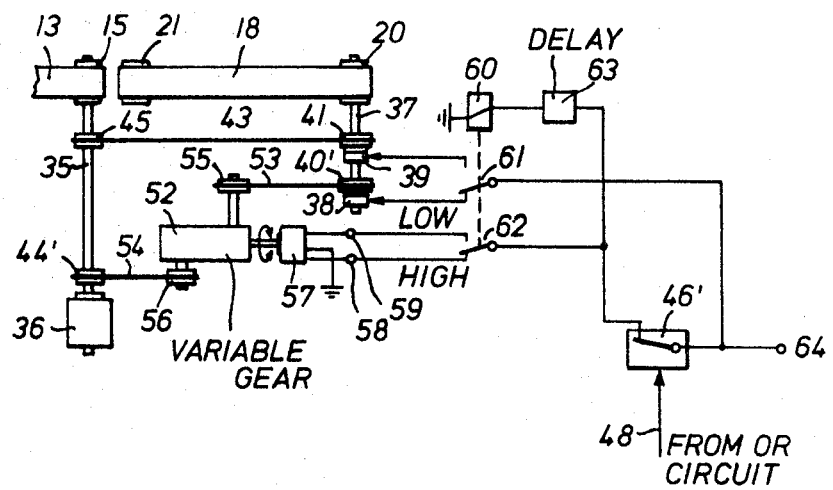
FIG. 6 is a schematic diagram relating to a modified monitoring and control system for the embodiment of the present invention illustrated in FIGS. 1 and 2.

FIG. 6 relates to a modification of the system shown in FIG. 3. Only that part of the system has been illustrated which has been altered with respect to the system of FIG. 3.

The mechanical construction in FIG. 6 differs from FIG. 3 in that between shaft 35 and shaft 37 a variable gear 52 is inserted. Pulleys 40' and 44' — corresponding to pulleys 40 and 44 in FIG. 3 — are in driven connection via belts 53 and 54 with an output pulley 55 and an input pulley 56, respectively, of variable gear 52.

The variable gear 52 may be shifted between two end positions, corresponding to a high gear ratio which results in an over-all transmission ratio equal to that from pulley 45 to pulley 41 (FIGS. 3 and 6), and a low gear ratio which may result in an overall transmission ratio equal to that from pulley 44 to pulley 40 in FIG. 3. Therefore with coupling 38 actuated and variable gear 52 in the "high" position, the first conveying speed $v_2$ results of guide rollers 20 and 22; the same is true, via pulleys 45 and 41, when coupling 39 is actuated. With coupling 38 actuated and variable gear 52 shifted to the "low" position however, the second conveying speed $v_2$' is imparted to guide rollers 20 and 22.

Shifting of variable gear 52 from one of said end positions to the other is accomplished in a suitable, known manner by means of a geared reversible electric motor 57. With terminal 58 connected to supply voltage, motor 57 rotates in a sense as to bring variable gear 52 into the "high" position, while supply voltage at terminal 59 results in a sense of rotation as to bring gear 52 into the "low" position. Known limit switches are provided to stop motor 57 as soon as variable gear 52 has reached the respective end position. The transmission between motor 57 and the control elements of variable gear 52 actuated by it is rated as to bring gear 52 from one end position to the other within a shifting time of several, for instance 4, seconds.

A relay coil 60 actuating two single pole, double throw switches 61 and 62 is connectable via a known delay stage 63 by a single pole, single throw switch 46' to supply terminal 64. Switches 61 and 62 are in the illustrated position when coil 60 is not excited. After closing of switch 46', delay stage 63 causes a delay of the actuation of relay 60–61–62 which lasts longer than the shifting time of variable gear 52. If the shifting time is 4 seconds, as assumed above, the delay may for instance be 6 seconds. After opening of switch 46' however, switches 61 and 62 return immediately into their position as illustrated.

Switch 46' takes the position illustrated in FIG. 6 when no signal appears at the output of OR circuit 48 (FIG. 3), and is opened when such signal appears. Depending on the respective position, switch 61 connects coupling 38 or coupling 39 to supply terminal 64 and switch 62 connects terminal 58 or terminal 59 to switch 46.

In the modified system according to FIG. 6, the transition from conveying speed $v_2$ of the second conveying means to conveying speed $v_2'$ and back, proceeds as follows:

As long as no signal appears at the output of OR circuit 48, as during the stacking phase, relay 60, 61, 62 is actuated. Actuation of relay 60, 61, 62 connects coupling 39 to supply voltage via switch 61 and shaft 37 is driven via pulleys 45 and 41 according to the first conveying speed $v_2$. During the same period terminal 59 of motor 57 is connected via switches 62 and 46' to supply voltage so that variable gear 52 is in its position "low", resulting in a angular speed at the idling pulley 40' which corresponds to the second conveying speed $v_2'$.

As soon as an output signal from OR circuit 48 is present, under circumstances explained above, switch 46' is operated and opens the supply circuit for relay coil 60. Relay switches 61 and 62 fall back to the position illustrated in FIG. 6 so that switch 61 immediately breaks the supply circuit for coupling 39 and closes the circuit for coupling 38. Switch 62 connects terminal 58 of motor 57 to switch 46', which has no effect on the position of gear 52 since switch 46' is open and gear 52 remains in its "low" position. Shaft 37 will now be driven via pulley 40' at the second conveying speed $v_2'$.

When the output signal of OR circuit 48 disappears again, upon completion of the conveying step of the conveyor belt 2, as explained in detail above, switch 46' returns to its rest position, closing the supply circuit for relay switch 62 and preparing switch 62 for actuation by relay coil 60. While delay 63 delays the actuation of relay 60, 61, 62 for six seconds, motor 57 is started immediately via switch 46' and switch 62. Motor 57 shifts variable gear 52 from its "low" position to its "high" position, which gradually switches shaft 37 from the second conveying speed $v_2'$, to the first conveying speed $v_2$. This shifting may be completed within, for example 4 seconds. During the shifting, at least a portion of the overlapping articles in the second conveying path are displaced from their overlapping position by third conveying means 103 and are individually discharged therefrom.

After completion of the 6 seconds delay caused by stage 63, relay 60, 61, 62 is actuated. Switch 61 brakes the supply circuit for coupling 38 and closes the circuit for coupling 39. Since shaft 37 at this moment is already driven according to the first conveying speed $v_2$, which corresponds to the speed of revolution of pulley 41, no change of speed occurs, when coupling 39 is actuated. Terminal 59 of motor 57 is now connected to supply voltage via switches 62 and 46', and motor 57 starts to shift variable gear 52 from its "high" position to its "low" position. This shift decelerates the idling pulley 49 to an angular speed which corresponds to the second conveying speed $v_2'$ in preparation for the next cycle of operation. In the illustrated and described stacking apparatus, the articles 1' are stacked in a horizontal orientation. However, the present invention is, of course, not limited to this orientation, but can also be applied to stacking apparatus in which the articles 1' are stacked on edge, or in any intermediate orientation. It is further obvious to equip the stacking apparatus disclosed in the above-mentioned German printed application No. 1,260,384 in the sense of the present invention.

It will be understood that the above description of the present invention is susceptible to various modifications, changes and adaptations, and the same are intended to be comprehended within the meaning and range of equivalents of the appended claims.

We claim:

1. Apparatus for forming stacks of flat articles that are consecutively delivered from a continuous stream of such articles to a stacking location, with a majority of the articles being delivered as separate articles with no overlapping between adjacent articles, comprising, in combination:

a. a first conveying means for positively conveying flat articles at a predetermined constant speed along a first conveying path and having an outlet;

b. a second conveying means for positively conveying articles received from said first conveying means along a second conveying path and having an inlet spaced from the outlet of said first conveying means by a distance greater than the length of an individual articles;

c. an abutment surface arranged to extend in the direction of said second conveying path, the first and second conveying paths being arranged at an acute angle $\alpha$ with respect to one another, the vertex of angle $\alpha$ being on said abutment surface and adjacent the input of said second conveying means;

d. means for selectively moving articles along said second conveying path at a first predetermined speed and a second predetermined speed less than the first speed;

e. means for monitoring the stream of articles and sensing the thickness of a stack for switching said means for selectively moving from the first speed to the second speed when a predetermined stack thickness has been reached so that temporarily articles overlap one another at the input of said second conveying means and a gap is produced in the stream of articles; and f. means for receiving articles from said second conveying means for forming a stack and for rapidly moving a stack of articles when a predetermined stack thickness has been reached.

2. Apparatus as defined in claim 1, wherein said second conveying means has a conveyor belt which forms said abutment surface.

3. Apparatus as defined in claim 2, wherein said first conveying means has a conveyor belt arranged on a side of the first conveying path facing away from said abutment surface, which conveyor belt extends forward into the vicinity of the inlet of said second conveying means.

4. Apparatus as defined in claim 2, wherein the stacks of articles received from said second conveying means are formed on the side of the second conveying path defined by the conveyor belt forming said abutment surface.

5. Apparatus as defined in claim 4, further including a third conveying means for positively conveying flat articles at a predetermined constant speed along a third conveying path, said third conveying means being arranged to receive articles from said second conveying means and discharge articles on the means for forming a stack.

6. Apparatus as defined in claim 5, wherein said second conveying means has an outlet and said third conveying means has an inlet spaced from the outlet of said second conveying means by a distance greater than the length of an individual article.

7. Apparatus as defined in claim 6, wherein said third conveying means has means for guiding arranged between the outlet of said second conveying means and the inlet of said third conveying means and defining a passage having a spacing greater than the thickness of the stream of overlapping articles received from said second conveying means.

8. Apparatus as defined in claim 7, wherein after a stack is moved when a predetermined thickness has been reached for the stack, said means for selectively moving articles gradually switches from the second speed to the first speed, and at least a portion of the overlapping articles in the second conveying path are displaced from their overlapping position by said third conveying means and are individually discharged therefrom.

9. Apparatus as defined in claim 4, wherein after a stack has been moved when a predetermined thickness has been reached for the stack, said means for selectively moving said articles is rapidly switched from the second speed to the first speed so that the overlapping articles in the second conveying path are moved together and are discharged from said second conveying means in overlapping arrangement.

10. Apparatus as defined in claim 9, further including a third conveying means for positively conveying flat articles received from said second conveying means at a predetermined constant speed along a third conveying path and discharging the articles onto the means for forming a stack.

11. Apparatus as defined in claim 4, wherein the outlet of said first conveying means has means for curving the articles about their longitudinal axes before they abut on said abutment surface.

12. Apparatus as defined in claim 4, wherein the first, second, and third conveying means each have two endless belts arranged to grip articles between them for positively conveying the articles.

* * * * *